_(12)_ United States Patent
Klemt et al.

US011298688B2

(10) Patent No.: US 11,298,688 B2
(45) Date of Patent: *Apr. 12, 2022

(54) HYDROGENATION CATALYST AND METHOD FOR PREPARING THE SAME

(71) Applicant: SHELL OIL COMPANY, Houston, TX (US)

(72) Inventors: Andreas Klemt, Leuna (DE); László Domokos, Amsterdam (NL); Frank Peter Friedel, Leuna (DE); Stefan Boettcher, Leuna (DE); Erwin Roderick Stobbe, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/063,922

(22) PCT Filed: Dec. 20, 2016

(86) PCT No.: PCT/EP2016/081922
§ 371 (c)(1),
(2) Date: Jun. 19, 2018

(87) PCT Pub. No.: WO2017/108791
PCT Pub. Date: Jun. 29, 2017

(65) Prior Publication Data
US 2018/0369790 A1 Dec. 27, 2018

(30) Foreign Application Priority Data
Dec. 21, 2015 (EP) .................... 15201753

(51) Int. Cl.
| | | |
|---|---|---|
| *B01J 23/75* | (2006.01) | |
| *B01J 37/03* | (2006.01) | |
| *B01J 37/08* | (2006.01) | |
| *B01J 37/18* | (2006.01) | |
| *B01J 35/00* | (2006.01) | |
| *B01J 35/10* | (2006.01) | |
| *C10G 2/00* | (2006.01) | |
| *B01J 21/06* | (2006.01) | |
| *B01J 37/02* | (2006.01) | |
| *B01J 23/74* | (2006.01) | |
| *B01J 37/04* | (2006.01) | |
| *B01J 37/06* | (2006.01) | |
| *B01J 31/04* | (2006.01) | |

(52) U.S. Cl.
CPC ............ *B01J 23/75* (2013.01); *B01J 21/063* (2013.01); *B01J 23/74* (2013.01); *B01J 35/006* (2013.01); *B01J 35/0013* (2013.01); *B01J 35/0053* (2013.01); *B01J 35/0066* (2013.01); *B01J 35/1019* (2013.01); *B01J 37/0203* (2013.01); *B01J 37/0205* (2013.01); *B01J 37/0207* (2013.01); *B01J 37/035* (2013.01); *B01J 37/04* (2013.01); *B01J 37/06* (2013.01); *B01J 37/086* (2013.01); *B01J 37/18* (2013.01); *C10G 2/332* (2013.01); *B01J 31/04* (2013.01)

(58) Field of Classification Search
None
See application file for complete search history.

(56) References Cited

U.S. PATENT DOCUMENTS

| | | |
|---|---|---|
| 4,096,168 A | 6/1978 | Hallgren |
| 4,113,658 A | 9/1978 | Geus |
| 4,595,703 A | 6/1986 | Payne et al. |
| 4,892,822 A | 1/1990 | Abramowicz et al. |
| 5,354,923 A | 10/1994 | Schon et al. |
| 5,589,564 A | 12/1996 | Komiya et al. |
| 5,945,459 A | 8/1999 | Mauldin |
| 7,560,412 B2 | 7/2009 | Osbourne et al. |
| 7,763,745 B2 | 7/2010 | Van Der Heide et al. |
| 8,394,864 B2 | 3/2013 | Van De Loosdrecht et al. |
| 8,877,671 B2 * | 11/2014 | Radlowski ............... B01J 37/08 502/167 |
| 9,248,435 B2 | 2/2016 | Van Rensburg |
| 2003/0120115 A1 | 6/2003 | Ansmann et al. |
| 2004/0152861 A1 | 8/2004 | Nefzger et al. |
| 2005/0026776 A1 | 2/2005 | Yamada et al. |

(Continued)

FOREIGN PATENT DOCUMENTS

| | | |
|---|---|---|
| CN | 101224425 A | 7/2008 |
| CN | 102811807 A | 12/2012 |

(Continued)

OTHER PUBLICATIONS

International Search Report and Written Opinion received for PCT Patent Application No. PCT/US2016/067659, dated Mar. 21, 2017, 10 pages.
International Search Report and Written Opinion received for PCT Patent Application No. PCT/US2016/067664, dated Mar. 29, 2017, 10 pages.
International Search Report and Written Opinion received for PCT Patent Application No. PCT/US2016/067666, dated Mar. 28, 2017, 8 pages.
International Search Report and Written Opinion received for PCT Patent Application No. PCT/US2016/067672, dated Mar. 28, 2017, 8 pages.

(Continued)

*Primary Examiner* — Colin W. Slifka
*Assistant Examiner* — Michael Forrest
(74) *Attorney, Agent, or Firm* — Shell Oil Company

(57) ABSTRACT

The invention relates to a method for preparing a hydrogenation catalyst or catalyst precursor comprising a catalytically active material and a carrier material. The method involves the mixing of an acidic solution comprising metal ions of a metal selected from the IUPAC group 8, 9 or 10 metals, preferably cobalt, a suspension comprising the carrier material and an alkaline solution. The invention also relates to a precursor of a hydrogenation catalyst wherein the precursor comprises crystallites of metal oxides having an average size of max. 8 nm.

12 Claims, No Drawings

(56) References Cited

U.S. PATENT DOCUMENTS

| | | |
|---|---|---|
| 2008/0255257 A1 | 10/2008 | Kuipers et al. |
| 2011/0301024 A1 | 12/2011 | Terorde et al. |
| 2012/0083540 A1 | 4/2012 | Botha et al. |
| 2013/0131339 A1* | 5/2013 | Heidemann ............ B01J 23/835 544/106 |
| 2014/0088206 A1 | 3/2014 | Daly et al. |

FOREIGN PATENT DOCUMENTS

| | | | |
|---|---|---|---|
| CN | 104174400 A | 12/2014 | |
| EP | 0071770 A2 | 2/1983 | |
| EP | 0167215 A2 | 1/1986 | |
| EP | 0168894 A2 | 1/1986 | |
| EP | 0178008 A1 | 4/1986 | |
| EP | 0363537 A1 | 4/1990 | |
| EP | 0398420 A2 | 11/1990 | |
| EP | 0498976 A1 | 8/1992 | |
| EP | 0807656 A1 | 11/1997 | |
| EP | 1134248 A1 | 9/2001 | |
| EP | 1017495 B1 | 1/2003 | |
| EP | 2286913 A2 | 2/2011 | |
| EP | E P-2286913 A2 * | 2/2011 | ............ B01J 29/06 |
| JP | 6416826 A | 1/1989 | |
| WO | 9700231 A1 | 1/1997 | |
| WO | 2007068731 A1 | 6/2007 | |
| WO | 2013054091 A1 | 4/2013 | |
| WO | 2014189879 A1 | 11/2014 | |

OTHER PUBLICATIONS

International Search Report and Written Opinion received for PCT Patent Application No. PCT/EP2016/081922, dated Mar. 9, 2017, 16 pages.

Mostafa et al., "Effect of Preparation and Operation Conditions on the Catalytic Performance of Cobalt-based Catalysts for Light Olefins Production", Fuel Processing Technology, Sep. 29, 2011, vol. 93, Issue No. 1, pp. 90-98, XP028117965.

Delmon, "Preparation of Heterogeneous Catalysts; Synthesis of Highly Dispersed Solids and their Reactivity", Journal of Thermal Analysis and Calorimetry, Sep. 22, 2007, vol. 90, Issue No. 1, pp. 49-65, XP019531249.

Lei et al., "Studies on Surface Impregnation Combustion Method to Prepare Supported Co/Sio Catalysts and its Application for FischerTropsch Synthesis", Applied Catalysis A: General, Jun. 6, 2012, vol. 435, pp. 217-224, XP028425865.

Feyzi et al., "Effect of Preparation and Operation Conditions on the Catalytic Performance of Cobalt-based Catalysts for Light Olefins Production", Fuel Processing Technology, vol. 93, Issue No. 1, Sep. 29, 2011, pp. 90-98, XP028117965.

Wang et al., "NIMO Catalysts Supported on Graphene-Modified Mesoporous TiO2 Toward Highly Efficient Hydrodesulfurization of Dibenzothiophene", Applied Catalysis: A General, vol. 502, 2015, pp. 157-165.

* cited by examiner

HYDROGENATION CATALYST AND METHOD FOR PREPARING THE SAME

CROSS REFERENCE TO RELATED APPLICATIONS

This is a national stage application of International Application No. PCT/EP2016/081922, filed 20 Dec. 2016, which claims benefit of priority to European Patent Application No. 15201753.9, filed 21 Dec. 2015.

FIELD OF THE INVENTION

The present invention relates to a method for preparing a hydrogenation catalyst or catalyst precursor thereof comprising a catalytically active material and a carrier material. The present invention relates to a catalyst particle and catalyst precursor thereof obtainable by said method. The present invention relates to a process for preparing hydrocarbons wherein said catalyst is used.

BACKGROUND TO THE INVENTION

The catalytic preparation of hydrocarbons from synthesis gas, i. e. a mixture of carbon monoxide and hydrogen, is well known in the art and is commonly referred to as Fischer-Tropsch synthesis.

Catalysts suitable for use in a Fischer-Tropsch synthesis process typically contain a catalytically active metal of group 8, 9 or 10 of the Periodic Table of the Elements (Handbook of Chemistry and Physics, 89th edition, CRC Press, 2008-2009) supported on a refractory oxide, such as alumina, titania, zirconia, silica or mixtures of such oxides. In particular, iron, nickel, cobalt and ruthenium are well known catalytically active metals for such catalysts. Reference may be made to EP-A-398420, EP-A-178008, EP-A-167215, EP-A-168894, EP-A-363537, EP-A-498976 and EP-A-71770, optionally in combination with one or more metal oxides and/or metals as promoters selected from zirconium, titanium, chromium, vanadium and manganese, especially manganese. Such catalysts are known in the art and have been described for example, in the specifications of WO 9700231A and U.S. Pat. No. 4,595,703. CN 104 174 400, US 2012/083540, U.S. Pat. No. 5,945,459, US 2011/301024 and LEI SHI ET AL: "Studies on surface impregnation combustion method to prepare supported Co/SiO catalysts and its application for Fischer-Tropsch synthesis", (APPLIED CATALYSIS A: GENERAL, ELSEVIER SCIENCE, AMSTERDAM, NL, vol. 435, 6 Jun. 2012 (2012-06-06), pages 217-224, XP028425865, ISSN: 0926-860X, DOI: 10.1016/J.APCATA.2012.06.007) disclose methods involving impregnation.

Catalysts can be prepared by obtaining a metal hydroxide, carefully oxidising it to the metal oxide and then placing it in the appropriate reactor where it is reduced to the metal in situ.

CN 104 174 400 discloses a method of manufacturing a Fischer-Tropsch catalyst based on impregnating a carrier material.

The first step of the process according to US 2012/083540 entails providing Fe(II) carboxylate in solution. This solution may be formed by means of a dissolution step wherein a source of iron, Fe(0), is dissolved in a suitable solution, preferably an acidic solution, preferably an aqueous solution including one or more carboxylic acids, in order to convert iron in the zero oxidation state to Fe(II) carboxylate in solution where the iron is in an oxidation state of two.

U.S. Pat. No. 5,945,459 discloses a preparation of a catalyst, in which a preformed particulate refractory inorganic solids support is impregnated with a compound, or salt, of a catalytic metal. Similarly, US 2011/301024 discloses a preparation method based on impregnation.

There is a continuous interest in finding catalysts for use in the Fischer-Tropsch synthesis which provide an improved activity and/or an improved selectivity in the conversion of carbon monoxide into valuable hydrocarbons, in particular hydrocarbons containing 5 or more carbon atoms ("C5+ hydrocarbons" hereinafter), and which minimise the formation of methane, which is a hydrocarbon carbon frequently considered as being of lower value.

SUMMARY OF THE INVENTION

A method has been found which provides for an improved hydrocarbon synthesis catalyst and precursor thereof. Said catalysts have a higher C5+ selectivity and activity.

The present invention provides for an improved catalyst.

Accordingly, the present invention provides for a method for preparing a hydrogenation catalyst comprising a catalytically active material and a carrier material, wherein:

an acidic solution comprising metal ions of a metal selected from the IUPAC group 8, 9 or 10 metals, preferably cobalt;
a suspension comprising the carrier material;
an alkaline solution; and said method comprising a step d.:

d. Mixing the acidic solution, the suspension and the alkaline solution causing the cobalt to precipitate in the presence of the carrier material, obtaining a mixture comprising a precipitate;

wherein at least the alkaline solution comprises a conjugated base of a carboxylic acid and/or the suspension comprises a carboxylic acid or a conjugated base thereof, preferably step d. is preceded by step a., b., and/or c. in which the acidic solution, the suspension and the alkaline solution are prepared, respectively.

The present invention provides for a precursor of a hydrogenation catalyst and a catalyst obtained from said precursor. Said precursor comprises a metal salt of a group 8, 9 or 10 metal, preferably cobalt(II) on a carrier material wherein the precursor after calcination comprises crystallites of metal oxides having an average crystallite size of maximally 8 nm as measured with XRD.

DETAILED DESCRIPTION OF THE INVENTION

It has been found that with the method according to the present invention a hydrogenation catalyst can be obtained having an increased activity compared to the prior art catalysts. Preferably the catalyst or catalyst precursor obtained with the method and the catalyst precursor according to the present invention, are hydrocarbon synthesis catalysts (or precursor thereof) and more preferably are Fischer-Tropsch catalysts (or a precursor thereof).

The present invention relates to a method in which a catalytic metal component or precursor thereof is precipitated on a carrier material. The inventors have found that the metal precursors are deposited such that a high dispersion is achieved. This differs from impregnation. With impregnation a shaped (extruded, pilled etc.) support material is provided with catalytically active material.

The inventors have found that the presence of ammonia, ammonia salts and/or ammonia releasing compounds such as urea have an adverse effect on the properties of the catalyst. Hence in an embodiment of the present invention none of these compounds are present in any of the solutions and suspension. The inventors have found that ammonia and ammonia releasing compounds are not required for a high dispersion of the precipitated metal precursors.

With mixing is meant that two or more solutions are added to a vessel and mixed. Said vessel may contain the suspension and the alkaline and acidic solutions may be added. Adding may be achieved batch wise or in a continuous fashion. Preferably both solutions are added to the suspension at separate positions while stirring the solution.

Alternatively, the method may be conducted in a continuous fashion in which the carrier material containing suspension is admixed together with the acidic and alkaline solution in step d. Preferably the suspension is added such that the level of suspended carrier material remains constant in the mixture of step d., while precipitated material is withdrawn from the mixture.

With obtaining a mixture is meant that during the addition of two or more of the solutions are added to the suspension a mixture is created. The mixture is not only obtained after completion of the addition but also arises at the start of addition. As indicated, the metal(s) will precipitate on the carrier material in ionic form during mixing.

In an embodiment the carboxylic acid or a conjugated base thereof (together and separately referred to as the additive) comprises at least one carboxylic acid group. The carboxylic acid or its conjugated base may have a hydroxyl group on the alpha carbon position.

In an embodiment the carboxylic acid or a conjugated base thereof has at least one carboxylic acid group having a pKa value in the range of 3.0-6.5, and in the preferred case with more carboxylic groups at least 2 of the carboxylic acid groups preferably have a pKa values in the range of 4.0-6.5.

In an embodiment the carboxylic acid or a conjugated base thereof is selected from the group consisting of citric acid, malic acid, tartaric acid, gluconic acid or combinations thereof, preferably the acid is citric acid.

In an embodiment the carboxylic acid is present at least in the suspension and the molar ratio of the carboxylic acid or a conjugated base thereof, to the group 8, 9 or 10 metal is during mixing maximally 1:5 and preferably at least 1:40, preferably at least 1:20 and more preferably in case the group 8, 9 or 10 metal is cobalt the carboxylic acid or a conjugated base, to cobalt ratio is from 1:15 to 1:10, during mixing.

In an embodiment the conjugated base of the carboxylic acid is present at least in the alkaline solution and the molar ratio of the conjugated base thereof, to the group 8, 9 or 10 metal is during mixing maximally 1:5 and preferably at least 1:40, preferably at least 1:20 and more preferably in case the group 8, 9 or 10 metal is cobalt the carboxylic acid or a conjugated base, to cobalt ratio is from 1:15 to 1:10, during mixing.

In an embodiment the pH of the mixture is raised to a pH of at least 5.5 and preferably maintained in the pH range of 5.5 to 10.5 and preferably between 6.5 and 9.

In an embodiment the temperature of the mixture is maintained at a temperature of maximally 95° C. and preferably at least 40° C., preferably in the range of 60-95° C.

In an embodiment the method further comprises a step e. wherein:
  e. The precipitate obtained in step d. is separated from the mixture, preferably by means of filtration over a filter press, to obtain a catalyst precursor as a retentate. The catalyst precursor material may be obtained by filter press or the like. The obtained filter cake (retentate) may be dried further if required.

In an embodiment the method comprises a step of:
  f. Washing the retentate at least once with a washing medium. Preferably water is used to wash the retentate.

In an embodiment the method comprises a step g. wherein:
  g. Drying the retentate obtained in step e. or f.

In an embodiment the alkaline solution is added after the start of mixing of the acidic solution and the suspension, preferably the alkaline solution is added after completion of the mixing of the acidic solution and the suspension.

In an embodiment, step d. is preceded by step a., b. and/or c. In steps a., b. and c. the acidic solution, suspension and alkaline solution are prepared respectively.

In an embodiment the method is conducted batch wise such that first the alkaline solution is added to the suspension until the mixture reaches a pH of 5.5 or higher, continuing the addition of the alkaline solution to the suspension while simultaneously adding the acidic solution and mixing. Preferably the pH is maintained in the pH range of 5.5 to 10.5 and preferably between 6.5 and 9.

In an embodiment the alkaline solution comprises a carbonate containing salt. Preferably, the carbonate containing salt is potassium carbonate, sodium carbonate or a combination thereof. Another base may be present and preferably is selected from the group consisting of sodium hydroxide and potassium hydroxide. The alkaline solution may be added in step d. such that molar ratio of carbonate: IUPAC group 8, 9 or 10 metals, is at least 0.5. The inventors have found that in case cobalt is selected good results are obtained.

In an embodiment of the present invention the carboxylic acid has at least one pKa value in the range of 3.0-6.5 and preferably 4.0-6.5. Good results were obtained with these kinds of additives. In an embodiment of the present invention the additive comprises at least two carboxylic groups and has at least one pKa value in the range of 4.0-6.5, preferably at least 2 pKa values in the range of 4.0-6.5.

In an embodiment of the present invention the additive is selected from one or more members of the group consisting of organic buffers.

In an embodiment of the present invention the additive comprises at least one polyprotic acid.

In an embodiment of the present invention the additive is selected from the group consisting of citric acid, malic acid, tartaric acid or combinations thereof, preferably the additive is citric acid or a citrate salt.

In an embodiment the method according to the present invention further comprises a step of calcining the particles after step d., e., f. or g. The effect of the calcination treatment is to remove (crystal) water, to decompose volatile decomposition products and to convert organic and inorganic compounds to their respective oxides. In an embodiment of the present invention, calcining is performed at maximally 650° C., preferably maximally 400° C. and more preferably maximally 350° C.

According to the prior art (see for example WO2007/068731) calcination is carried out at a temperature generally from 350 to 750° C. The temperatures used in the prior art have an adverse effect on the activity of the catalyst but until now the adverse effects were considered to be less of a disadvantage than the disadvantages of calcining at a lower temperature. The present inventors have found that for the catalyst precursor particles obtained with the method according to the present invention catalysts are obtained with improved selectivity and activity.

The present invention provides for a precursor of a hydrogenation catalyst comprising a metal salt of a group 8, 9 or 10 metal, preferably cobalt(II) on a carrier material wherein the precursor after calcination comprises crystallites of metal oxides having an average crystallite size of maximally 8 nm as measured with XRD. The inventors have found that catalysts having oxidic crystallites of this size or less show good catalytic activity and selectivity upon activation to their metallic state. Further explanation of XRD is provided in the examples.

In an embodiment of the invention the precursor has a BET value and the metal in its oxidic state contributes to the total BET value of the precursor upon oxidation of maximum 350° C. in an amount of at least 120 m2/gram metal, preferably at least 160 m2/g.

In an embodiment of the invention the precursor comprises a metal salt of a metal selected from the group 8, 9 or 10 metals on a carrier material wherein the relative difference in BET value between the precursor and untreated carrier is at least 20% relative to the BET value of the untreated carrier material, preferably at least 50%. Said precursor may be obtained with the method according to the present invention. The inventors have found that the precursor according to the present invention results in an improved catalyst having good activity and selectivity properties. Especially good results were obtained when cobalt is present as $Co^{2+}$.

In an embodiment the group 8, 9 or 10 metal is cobalt (II) and is present as cobalt hydroxyl carbonate, cobalt hydroxide and/or cobalt hydroxycarbonate and preferably as cobalt hydroxycarbonate.

In an embodiment maximally 6% of the group 8, 9 or 10 metal, preferably cobalt, is present in clusters having an equivalent diameter of 100 nm or larger. Preferably maximally 4% is present in clusters having an equivalent diameter of 100 nm or larger. A cluster is defined as a region in which the cobalt content is at least 125% of the average metal content of the sample.

In an embodiment of the invention the method comprises the steps of drying, calcining and reducing the material obtained in step b. By treating the material in such a way the catalyst precursor is activated.

In an embodiment of the present invention the catalyst particle has a Metal Surface Area (MSA) of at least 7.0 m² per gram and preferably at least 35.0 per gram of catalyst particle and preferably ranges from 35.0 to 100 m2 per gram of metal in the catalyst.

MSA is an indication of dispersion the metal upon reduction. The MSA for cobalt is determined by $H_2$-chemisorption at 150° C. Prior to chemisorption the catalyst precursor has been calcined at 350° C. and reduced at 350° C., each for a period of maximum 4 hours. The inventors have found that catalyst particles obtained according to the present invention having such an MSA give good results with respect to activity and C5+ selectivity in Fischer-Tropsch synthesis.

For the other group 8, 9 or 10 metals similar methods are known in the art to determine the MSA.

In an embodiment the catalyst particles according to the present invention have an activity of at least 400 gCH2/kg/h and more preferably 500 gCH2/kg/h, the WTY value being weight time yields (WTY), expressed as g(CH2 equivalent hydrocarbons)/kg catalyst/h. In an embodiment the catalyst particles have a C5+ selectivity of at least 90%.

A Fischer-Tropsch catalyst or catalyst precursor comprises a catalytically active metal or precursor therefor and optionally promoters, supported on a catalyst carrier. Examples of suitable carrier materials that may be present in the catalyst in addition to titania include: silica, alumina, zirconia, ceria, gallia and mixtures thereof, especially silica and alumina. In an embodiment the carrier material is selected from the group consisting of alumina, preferably alumina in the form of one or more aluminum oxides, silica ($SiO_2$), titania ($TiO_2$), magnesia (MgO), and zinc oxide (ZnO), and mixtures thereof, preferably titania or silica.

The catalyst carrier in this case preferably comprises a refractory metal oxide, more preferably alumina, silica, titania, or mixtures thereof, most preferably porous titania. As an example of a suitable carrier material can be mentioned the commercially available Titanium Dioxide P25 ex Evonik Industries. According to an embodiment of the present invention the carrier may comprise titania and another refractory metal oxide or silicate or combinations thereof.

The promotor preferably comprises one or more metals selected from Groups 2-7 and/or 10-12. Preferably a promotor is selected from Groups 2-7 and an activator is selected from Groups 10-12. Promoters can be selected from zirconium, titanium, chromium, vanadium and manganese, especially manganese. A most suitable catalyst or catalyst precursor comprises cobalt as the catalytically active metal and zirconium as a promoter. Another most suitable catalyst or catalyst precursor comprises cobalt as the catalytically active metal and manganese and/or vanadium as a promoter.

The promoter may be precipitated prior to step d. and/or during step d. simultaneously with, or after precipitation of the group 8, 9 or 10 metal. Alternatively, the promotor may be added after having formed the precursor after step d., either before or after shaping the precursor to a catalyst body by methods known in the state of the art, e.g. impregnation or co-mulling.

The present invention relates to a method for preparing hydrocarbons wherein a catalyst according to the present invention is applied. Preferably said hydrocarbons are synthesized in a multi-tubular reactor, a slurry reactor, a micro channel reactor or a plate reactor.

The catalyst obtained with a method according to the present invention is very suitable for use as a Fischer-Tropsch catalyst in case cobalt is selected as the group 8 metal. In an embodiment of the invention the catalyst is used as a Fischer-Tropsch catalyst in a multi tubular reactor.

In case the catalyst according to the present invention is used in a multi tubular reactor it is preferred that the catalyst precursor or catalyst is present in the tubes in catalyst bodies. Accordingly the invention also provides a method of manufacturing a catalyst body comprising: i. mixing a catalyst precursor or a calcined catalyst powder derived from said precursor according to the present invention with a liquid to form a paste; ii. adding said paste to an extruder, the extruder having a die plate comprising one or more dies, each die having a plurality of apertures; iii. extruding the paste through said apertures to form extrudates (the catalyst bodies). These catalyst bodies may be calcined at temperatures up to 650° C. and dried. The inventors found that the advantages of the invention are not or affected little by the manufacturing process of catalyst bodies.

Thus the present invention also provides a process for the production of liquid hydrocarbons from synthesis gas, the process comprising: converting synthesis gas in a reactor into liquid hydrocarbons, and optionally solid hydrocarbons and optionally liquefied petroleum gas, at elevated temperatures and pressures; using a catalyst prepared as described herein.

Products of the Fischer-Tropsch synthesis may range from methane to heavy paraffin waxes. Preferably, the production of methane is minimized and a substantial portion of the hydrocarbons produced have a carbon chain length of a least 5 carbon atoms. Preferably, the amount of C5+ hydrocarbons is at least 90% by weight of the total product.

The appended claims form an integral part of the description by way of this reference. The embodiments of the present invention as described in the present specification and/or the appended claims may be combined.

The invention is illustrated by the following non-limiting examples.

EXAMPLES

Example 1

First, an alkaline and a metal nitrate solution were prepared. The alkaline solution was obtained by dissolving 30 g NaOH and 40 g Na2CO3 in 830 mL H2O. The metal nitrate solution was prepared by dissolving 198 g of Co(NO3)2.6H2O and 11 g of Mn(NO3)2.4H2O in 500 ml water. Secondly, 146 g TiO2 (Aeroxide P25 supplied by Evonik) were suspended in 830 ml water and heated under stirring to 95° C. Thus obtained suspension was brought to a pH of 7 by dosing a small amount of the basic solution. After reaching 95° C. both solutions were pumped parallel to the TiO2 suspension at a constant pH of 7 within 25 minutes. The suspension containing the precipitated catalyst precursor was further aged for 1 h at ° C. before pumping it to a filter press. There the precipitate was filtrated and washed with water. Finally, the wet filter cake was removed from the press and dried under air in a circulated oven and powdered.

Table 1 shows the effect of the presence of citric acid or citrate (additive) in the suspension or alkaline solution for the different catalysts. The additive was added to the alkaline solution or the suspension in such an amount that at the end of the addition and mixing step the additive to cobalt ratio was 1:13. Sample A was prepared without a carboxylic acid and is the comparative sample.

Fixed bed catalyst bodies were prepared as follows. The powdered samples were mixed with demineralized water and several extrusion aids. The extrusion aids act as flow-improving agents, peptising agents and strength improving agents. The amount of extrusion aids added to the mixture was below 3 wt %. The mixtures were kneaded to an extrudable paste. The extrudable paste was shaped using extrusion to extrudates with a diameter of approximately 2 mm. The extrudates were dried at 80° C. for at least 4 hours and calcined at 350° C. for 1 hour to remove organic materials. The obtained catalysts contained about 20 wt % cobalt and about 1 wt % of manganese.

Prior to the small scale catalytic test activity measurement, the extrudate samples were crushed to particle size below 0.4 mm. The MSA measurements for Example 1 were conducted on the crushed particles.

Catalytic activities can be measured, for example, in a model Fischer-Tropsch reactor. The catalytic activities measured may be expressed as Weight time yield (WTY), whereby the WTY is expressed as the formation of hydrocarbons over the catalyst weight in g hydrocarbons/kg catalyst.hr. Selectivity may be expressed as C5+ selectivity, whereby C5+ represents the weight fraction of hydrocarbons containing 5 or more hydrocarbons in the total amount of hydrocarbons being formed over the catalyst. In table 1 the activity for the samples according to the present invention is expressed relative to the activity of comparative sample A.

Samples prepared according to the invention were reduced with a hydrogen comprising gas at 280° C. for at least 24 hours, and then the activity and selectivity of the samples were determined during a Fischer-Tropsch reaction. The gas feed consisted of a mixture of 25% N2, 50% H2 and 25% CO. The gas was fed at a pressure of 30 bar.

Catalytic activities were measured at a temperature 205°+/−1° C. as a function of time on stream. Prior to testing the catalyst particles were diluted with inert ceramic particles as to enhance the isothermal nature of the small scale testing reactor inventory.

Selectivity was determined as a function of the conversion level by varying the space velocity at isothermal conditions. Selectivity was derived from reactant gas and product gas composition measurements on an online gas chromatograph. Reported C5+ selectivity was determined at equal CO conversion levels.

The results are shown in Table 1. In table 1 "Additive position" indicates where the additive is present during the manufacturing of the catalysts. The relative WTY is the WTY relative to sample A. Also, the selectivity is expressed relative to the selectivity of sample A.

TABLE 1

Results from Example 1.

| Sample ID | Additive position | Co MSA $m^2$/g sample | WTY (%) | C5+ [%] | Runhour range [hr] |
|---|---|---|---|---|---|
| A | None | 6.2 | 100 | 100 | 85-90 |
| 1 | Alkaline Solution | 8.5 | 172 | 102 | 85-90 |
| 2 | suspension | 7.1 | 161 | 102 | 85-90 |
| 3 | suspension | 7.8 | 166 | 102 | 85-90 |

The results listed in Table 1 clearly show an increase in activity and in C5+ selectivity for samples 1-3 compared to the comparative sample A.

Example 2

In order to understand further why samples 1-3 have an increased activity and selectivity the inventors determined the crystallite sizes of samples obtained in accordance to the present invention. Contrary to Example 1, the samples for Example 2 were the oven-dried and powdered samples.

The results for example 2 are listed in table 2. Table 2. lists the additives used (column "additive") and in which solution or suspension (column "additive position").

TABLE 2

Results for Example 2.

| Sample ID | Additive | Additive position | Co MSA $m^2$/g sample | Crystallite Size of Co3O4 by XRD (nm) |
|---|---|---|---|---|
| A | None | NA | 6.3 | 12 |
| 4 | Sodium Citrate | Alkaline Solution | 8.5 | 6 |
| 5 | Citric Acid | suspension | 9.4 | 6 |
| 6 | Sodium citrate | suspension | 9 | 6 |

The inventors noted that for all the samples obtained in accordance with the method of present invention an increase in MSA values is observed and a decrease in crystallite size. As shown in Example 1 catalysts with these properties show good results when applied as Fischer-Tropsch catalyst. These catalysts have an increased activity while a good C5+ selectivity is maintained and even a slight improvement is observed. The inventors attribute these improved properties to the high dispersion of cobalt on the carrier material. The inventors noted that the catalysts obtained with the method of the invention cobalt is highly dispersed resulting in smaller cobalt clusters.

It was determined that the catalyst precursor and catalysts obtained according to the present invention are characterized by a very low fraction of cobalt being present in clusters larger than 100 nm. Such cluster may comprise an agglomerate of small particles or one large conglomerate of cobalt material, and the material can be either amorphous or crystalline of nature. A cluster in our catalyst system is defined as cobalt rich region, i.e. a region where the Co content is at least 25% higher than the average content of the sample. The fraction of cobalt present in such clusters with an equivalent circle diameter of 100 nm is lower than 6% and preferably lower than 4%.

That which is claimed is:

1. A method for preparing a hydrogenation catalyst comprising a catalytically active material and a carrier material, the method comprising:
    providing an acidic solution comprising cobalt ions, a suspension comprising titania as carrier material, and an alkaline solution comprising a carbonate containing salt,
        wherein one or more of the alkaline solution and the suspension further comprises one of a carboxylic acid and a conjugated base thereof,
        wherein the conjugated base of the carboxylic acid is present at least in the alkaline solution and wherein the carboxylic acid and the conjugated base thereof have at least two carboxylic acid groups having a pKa value in the range of 4.0-6.5; and
    mixing the acidic solution, the suspension, and the alkaline solution causing the cobalt to precipitate in the presence of the carrier material to form a mixture comprising a metal precipitate.

2. The method according to claim 1, wherein the carboxylic acid and the conjugated base thereof comprise a hydroxyl group on an alpha carbon position.

3. The method according to claim 1, wherein the carboxylic acid and the conjugated base thereof is selected from the group consisting of citric acid, malic acid, tartaric acid, gluconic acid, and combinations thereof.

4. The method according to claim 1, wherein the pH of the mixture is raised to a pH of at least 5.5.

5. The method according to claim 1, wherein the temperature of the mixture is maintained at a temperature of maximally 100° C.

6. The method according to claim 1, further comprising separating the precipitate from the mixture to obtain a catalyst precursor as a retentate.

7. The method according to claim 6, further comprising washing the retentate at least once with a washing medium.

8. The method according to claim 7, further comprising drying the retentate.

9. The method according to claim 1, wherein the alkaline solution is added after the acidic solution and the suspension have been mixed.

10. The method according to claim 1, wherein the method is conducted batch wise such that first the alkaline solution is added to the suspension until the mixture reaches a pH of 5.5 or higher, and
    wherein once the mixture reaches a pH of 5.5 or higher, the addition of the alkaline solution to the suspension is continued while simultaneously adding the acidic solution and mixing.

11. The method according to claim 1, wherein the carboxylic acid and the conjugated base to cobalt molar ratio is from 1:15 to 1:10, during mixing.

12. The method according to claim 1, wherein none of the acidic solution, the suspension and the alkaline solution comprises ammonia, ammonia salt and/or ammonia releasing compound.

* * * * *

UNITED STATES PATENT AND TRADEMARK OFFICE
CERTIFICATE OF CORRECTION

| | |
|---|---|
| PATENT NO. | : 11,298,688 B2 |
| APPLICATION NO. | : 16/063922 |
| DATED | : April 12, 2022 |
| INVENTOR(S) | : Andreas Klemt et al. |

It is certified that error appears in the above-identified patent and that said Letters Patent is hereby corrected as shown below:

In the Specification

In Column 7, Line 31, delete "° C." and insert -- 95° C. --.

Signed and Sealed this
Fifth Day of July, 2022

Katherine Kelly Vidal
*Director of the United States Patent and Trademark Office*